(12) United States Patent
Baumbach et al.

(10) Patent No.: US 10,755,486 B2
(45) Date of Patent: Aug. 25, 2020

(54) OCCLUSION USING PRE-GENERATED 3D MODELS FOR AUGMENTED REALITY

(71) Applicant: Disney Enterprises, Inc., Burbank, CA (US)

(72) Inventors: Elliott H. Baumbach, Porter Ranch, CA (US); Jonathan R D Hsu, Pomona, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/957,807

(22) Filed: Apr. 19, 2018

(65) Prior Publication Data

US 2019/0325661 A1 Oct. 24, 2019

(51) Int. Cl.
*G06T 19/20* (2011.01)
*G06T 15/00* (2011.01)
*G06T 19/00* (2011.01)

(52) U.S. Cl.
CPC ............ *G06T 19/20* (2013.01); *G06T 15/005* (2013.01); *G06T 19/006* (2013.01)

(58) Field of Classification Search
CPC .......................... G06T 19/006; G06T 7/70–77
See application file for complete search history.

(56) References Cited

U.S. PATENT DOCUMENTS

| | | | | |
|---|---|---|---|---|
| 2005/0285879 A1* | 12/2005 | Suzuki | ................ | G06T 19/006 345/633 |
| 2014/0361956 A1* | 12/2014 | Mikhailov | ............. | A63F 13/00 345/8 |
| 2016/0042566 A1* | 2/2016 | Mao | ...................... | A63F 13/213 463/32 |
| 2016/0140764 A1* | 5/2016 | Bickerstaff | ......... | G02B 27/017 345/633 |
| 2016/0175702 A1* | 6/2016 | Black | ..................... | A63F 13/28 463/31 |
| 2016/0225192 A1* | 8/2016 | Jones | ..................... | G06F 3/012 |

(Continued)

OTHER PUBLICATIONS

Fuhrmann et al., "Occlusion in collaborative augmented environments", 1999, Computers & Graphics 23 (1999), pp. 809-819 (Year: 1999).*

(Continued)

*Primary Examiner* — Phong X Nguyen
(74) *Attorney, Agent, or Firm* — Patterson + Sheridan, LLP (57) ABSTRACT

To prevent virtual content from occluding physical objects in an augmented reality (AR) system, the embodiments herein describe generating a pass-through texture using a pre-generated model of a physical object. In one embodiment, the AR system determines the location of the physical object as well as its orientation. With this information, the system rotates and re-sizes the pre-generated model of the object to match its location and orientation in the real-world. The system then generates the pass-through texture from the pre-generated model and inserts the texture into the virtual content. When the virtual content is displayed, the pass-through texture permits light from the real-world view to pass through substantially unaffected by the virtual content. In this manner, the physical object (which aligns with the location of the pass-through texture in the virtual content) can be seen by the user—i.e., is not occluded by the virtual content.

20 Claims, 7 Drawing Sheets

(56) References Cited

U.S. PATENT DOCUMENTS

| | | | | |
|---|---|---|---|---|
| 2016/0232715 A1* | 8/2016 | Lee | ....................... | G06T 19/006 |
| 2016/0307374 A1* | 10/2016 | Kurz | ..................... | G06T 19/006 |
| 2017/0060319 A1* | 3/2017 | Seo | ....................... | G06F 3/0416 |
| 2017/0090194 A1* | 3/2017 | Hayes | ................ | G02B 27/0101 |
| 2017/0294048 A1* | 10/2017 | Noguchi | ............. | G06F 3/04815 |
| 2018/0101989 A1* | 4/2018 | Frueh | ...................... | G06T 15/04 |
| 2018/0108179 A1* | 4/2018 | Tomlin | ............... | G02B 27/0172 |
| 2018/0300551 A1* | 10/2018 | Luccin | ................. | G06K 9/2063 |
| 2018/0350150 A1* | 12/2018 | Powderly | ............ | G06F 3/04815 |

OTHER PUBLICATIONS

Gabbard et al., "The Effects of Text Drawing Styles, Background Textures, and Natural Lighting on Text Legibility in Outdoor Augmented Reality", 2006, Presence, vol. 15, No. 1, Feb. 2006, 16-32 (Year: 2006).*

* cited by examiner

OCCLUSION USING PRE-GENERATED 3D MODELS FOR AUGMENTED REALITY

BACKGROUND

Field of the Invention

The present disclosure generally relates to the occlusion of a physical object by virtual content in an augmented reality (AR) and/or virtual reality (VR) system.

Description of the Related Art

Computer graphics technology has significantly progressed since the first video games were developed. Relatively inexpensive 3D graphics engines now provide nearly photo-realistic interactive gameplay on hand-held video game systems, home video game systems, and personal computer hardware platforms costing only a few hundred dollars. These video game systems typically include a hand-held controller, game controller, or, in the case of a hand-held video game systems, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of visual sensing device which may be used to capture an image or a series of images of a physical, real-world scene. The captured images can then be displayed, for instance, on a display of the hand-held gaming device. Certain devices may be configured to insert virtual objects into the captured images before the images are displayed or insert the virtual objects into a view of a real-world environment. Some devices may allow users to manipulate the virtual objects being displayed by, for example, moving the device or manipulating a joystick or buttons. This is commonly referred to as an augmented reality (AR) system.

SUMMARY

One embodiment described herein is a method that includes determining a location of a peripheral device of an augmented reality (AR) system in a real-world environment, determining an orientation of the peripheral device in the real-world environment, orienting and sizing a pre-generated model of the peripheral device to match a size and the orientation of the peripheral device relative to a viewpoint of a user, generating a pass-through texture using the pre-generated model, and inserting the pass-through texture into the virtual content where the pass-through texture permits light emitted from the real-world environment to be seen by the user without being occluded by virtual content. The method also includes outputting for display the pass-through texture and the virtual content.

Another embodiment described herein is computer-readable program code configured to perform, when executed by a processor, an operation, the operation includes determining a location of a peripheral device of an AR system in a real-world environment, determining an orientation of the peripheral device in the real-world environment, orienting and sizing a pre-generated model of the peripheral device to match a size and the orientation of the peripheral device relative to a viewpoint of a user, generating a pass-through texture using the pre-generated model, and inserting the pass-through texture into the virtual content where the pass-through texture permits light emitted from the real-world environment to be seen by the user without being occluded by virtual content. The operation also includes outputting for display the pass-through texture and the virtual content.

Another embodiment described herein is computer-readable program code configured to perform, when executed by a processor, an operation, the operation includes determining a location of a physical object in a real-world environment, determining an orientation of the physical object in the real-world environment, and orienting and sizing a pre-generated model of the physical object to match a size and the orientation of the physical object relative to a viewpoint of a user where the pre-generated model was generated before determining the location and orientation of the physical object. The operation includes generating a black texture using the pre-generated model, inserting the black texture into a portion of virtual content that corresponds to the location of the physical object in the real-world environment, and outputting for display the black texture and the virtual content to generate an AR image.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments herein describe inserting a pass-through texture (e.g., a black texture) into virtual content so that a physical object is not occluded by the virtual content in an AR image. As described above, AR systems can involve the insertion of virtual content into captured images or views of a physical, real-world scene. The combination of virtual and real-world objects can then be displayed to a user. However, the virtual content may occlude physical objects in the real-world scene or view. For example, a virtual character may be placed in the AR image to appear as if the character is standing five feet away from the user. However, there may be physical objects that are disposed between the user and the simulated position of the virtual character. As an example, the user holds a peripheral device (e.g., a game controller) which may be between the user and the simulated position of the virtual character. If the location of the peripheral device is not accounted for, when viewed by the user, the peripheral device is occluded or covered by the virtual character (e.g., the peripheral device appears to be behind the virtual character or the device cannot be seen). This reduces the realism of the AR system since the physical object should appear to the user as being in front of the virtual character.

To prevent the virtual content from occluding physical objects, the embodiments herein describe generating a pass-through texture using a pre-generated model of a physical object—e.g., the peripheral device. In one embodiment, the AR system determines the location of the peripheral device as well as its orientation. With this information, the system rotates and re-sizes the pre-generated model of the peripheral device to match its location and orientation in the real-world. The system then generates the pass-through texture from the pre-generated model and inserts the texture into the virtual content. When the virtual content is displayed, the pass-through texture permits light from the real-world view to pass-through substantially unaffected by the virtual content. In this manner, the peripheral device (which aligns with the location of the pass-through texture in the virtual content) can be seen by the user—i.e., is not occluded by the virtual content. Thus, it appears to the user as if the peripheral device is between the user and the virtual content.

Figure 1:
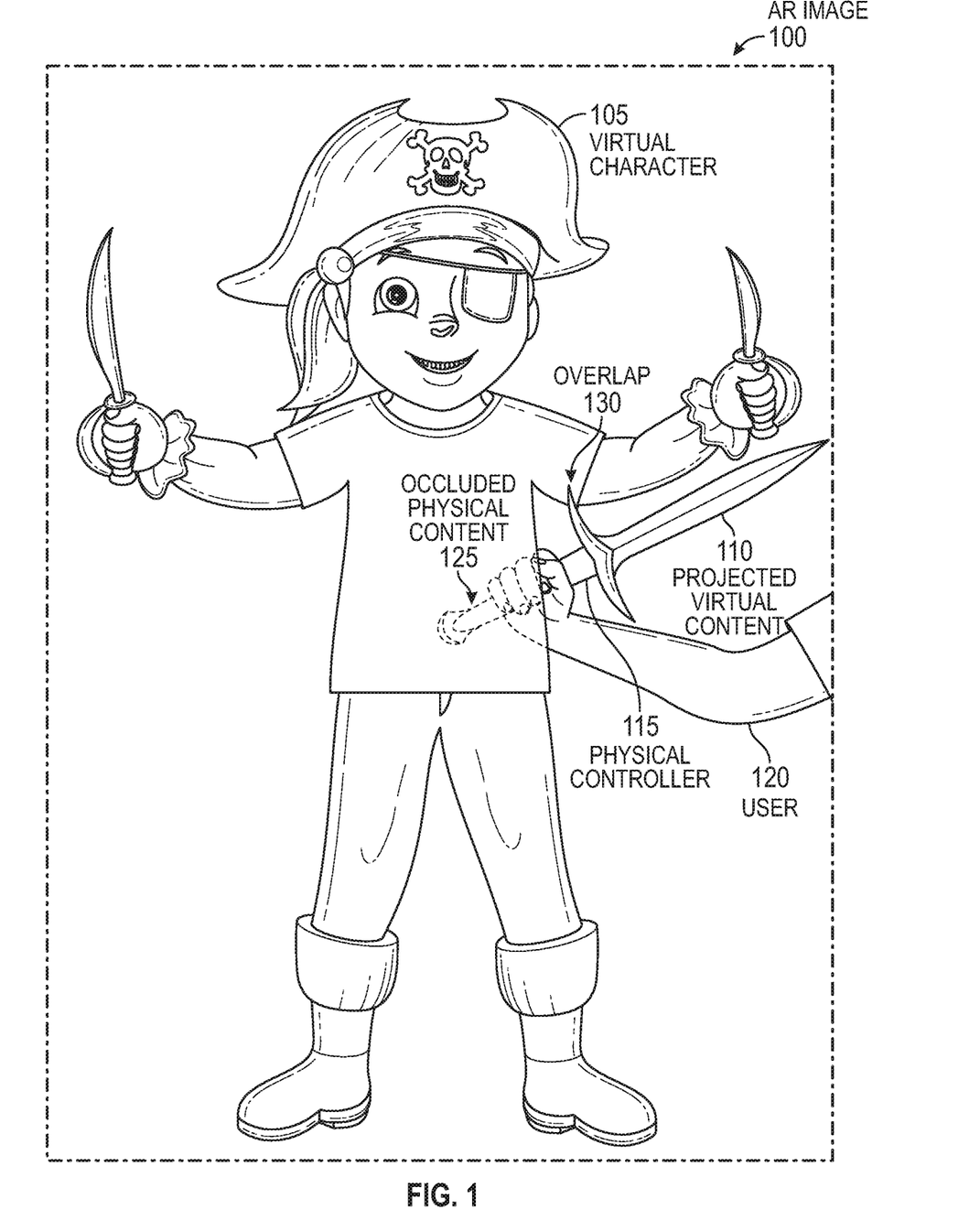
FIG. 1 is an AR image of a virtual character occluding a physical object, according to one embodiment described herein.

FIG. 1 is an AR image 100 of a virtual character 105 occluding a physical object, according to one embodiment described herein. The AR image 100 in FIG. 1 is presented from the perspective of a user 120 who may be wearing a headset which inserts the virtual character 105 into a view of the real-world.

In this example, the user 120 holds a physical controller 115 (e.g., a peripheral device) which is part of the AR system. As shown here, the AR system generates projected virtual content 110 which appears to be connected to the physical controller 115. For example, the physical controller may be designed to look like a hilt, while the projected virtual content 110 appears as the blade of a sword extending from the hilt. Using the physical controller 115, the user 120 can interact with the virtual character 105. For instance, the virtual character 105 may swing at the location of the user 120 with his virtual weapons which, as part of the gameplay, the user 120 attempt to block or parry using the blade formed by the projected virtual content 110. Using the game controller 115, the AR system can track the location of the projected virtual content 110 to determine whether the user 120 successfully deflected an attack by the virtual character 105, struck the virtual character 105, or was struck by the virtual character 105.

FIG. 1 illustrates occluded physical content 125 where the image 100 of the virtual character 105 displayed to the user 120 occludes or blocks (either partially or fully) the user 120 from seeing the physical controller 115 and part or her hand or arm. The dotted lines illustrate the portions of the physical controller 115 and the user 120 which are occluded by the virtual character 105. This occlusion reduces the realism of the AR system. That is, the virtual character 105 is displayed in the AR image 100 to appear to the user 120 as being some distance from the user (e.g., five feet away from the user 120) which is referred to herein as its simulated location in the AR image 100. As such, when the physical controller 115 (and her hand and arm) overlaps with the virtual character 105 in the AR image 100 (i.e., when at least a portion of the physical controller 115 is co-located with at least a portion of the virtual character 105 in the image 100), the user 120 expects the physical controller 115 to be viewable (or non-occluded) since the physical controller 115 should be closer to the location of the user 120 than the simulated location of the virtual character 105. However, because the virtual character 105 occludes the physical content 125, it appears to the user 120 that the virtual character 105 is actually closer to the user 120, or appears fake, thereby reducing realism.

As discussed below, the AR system can generate a pass-through texture which when inserted into the virtual character 105 permits the user to see the physical controller 115 without being occluded by the virtual character 105. This has a similar effect as the overlap 130 where the projected virtual content 110 is displayed over the virtual character 105. That is, because the AR system knows the virtual content 110 has a simulated location that is closer to the user 120 than the virtual character 105, the system displays the projected virtual content 110 such that it appears to be between the virtual character 105 and the user 120. By tracking the location and orientation of the physical controller 115, the AR system can generate a similar effect for physical objects.

Figure 2:
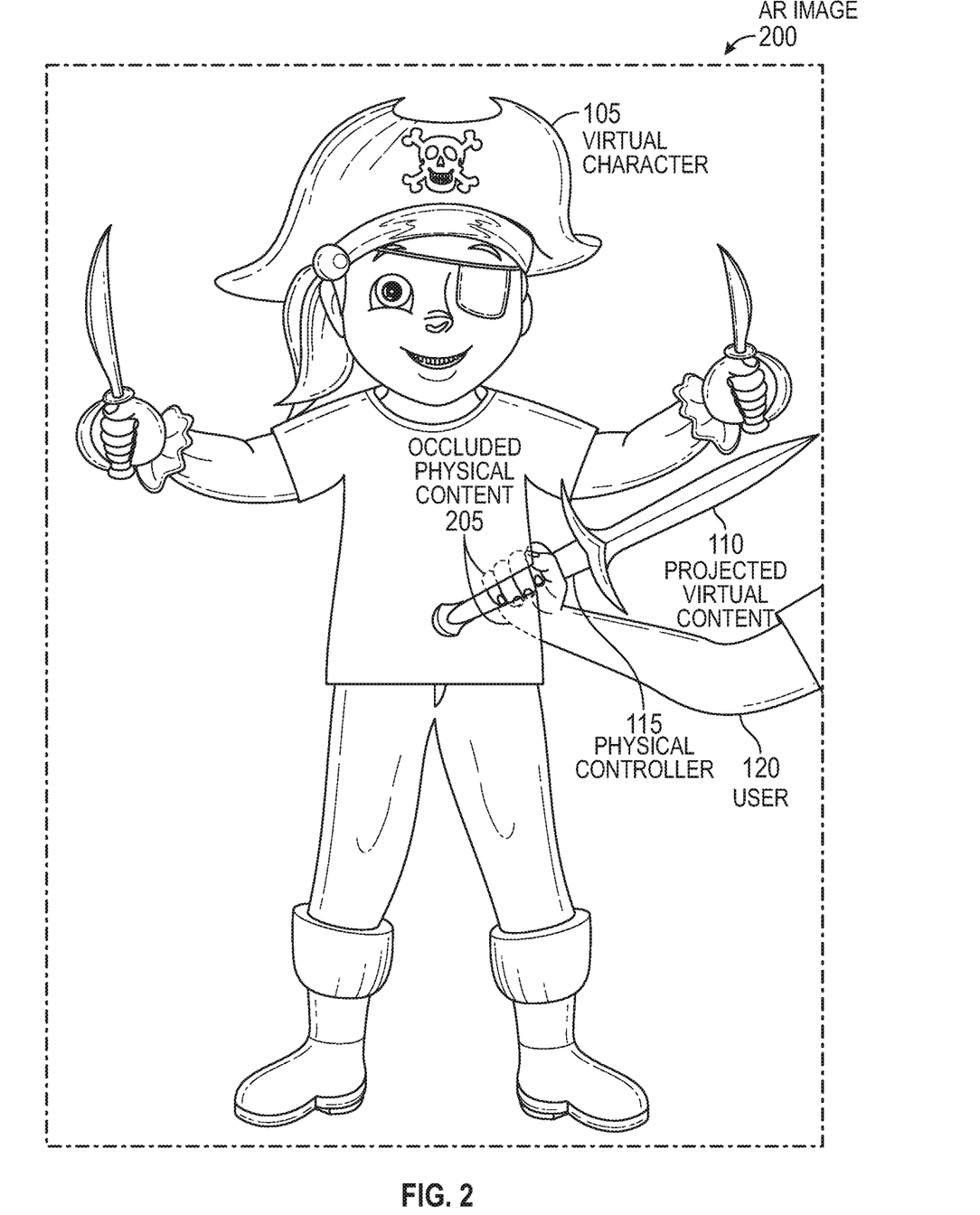
FIG. 2 is an AR image where the virtual character does not occlude the physical object, according to one embodiment described herein.

FIG. 2 is an AR image 200 where the virtual character 105 does not occlude the physical object (e.g., the physical controller 115), according to one embodiment described herein. Unlike in the AR image 100, in FIG. 2 the physical controller 115 appears to be in front of the virtual character 105. That is, the outline of the physical controller 115 is shown in solid lines to indicate that the controller 115 is not occluded by the virtual character 105. Thus, to the perspective to the user 120, it appears as if the virtual character 105 is behind the physical controller 115 thus maintaining the desired illusion that the virtual character 105 has a simulated location in the real-world that is further away from the user 120 than the location of the physical controller 115.

In one embodiment, the AR system generates a pass-through texture in the virtual character 105 which permits the physical controller 115 to be seen without being occluded, which is described in more detail below. While the pass-through texture matches the dimensions and orientation of the physical controller 115, in one embodiment, the portion of the hand or arm of the user 120 may still be occluded by the virtual character 105 as indicated by the occluded physical content 205 shown in ghosted lines. This may be an acceptable tradeoff since identifying a pass-through texture for the hand or arm of the user 120 may be a slow and compute intensive process. However, further embodiments described herein provide techniques where the pass-through texture can be expanded to include the arm and hand of the user 120 based on estimations of the user's position and orientation.

Figure 3:
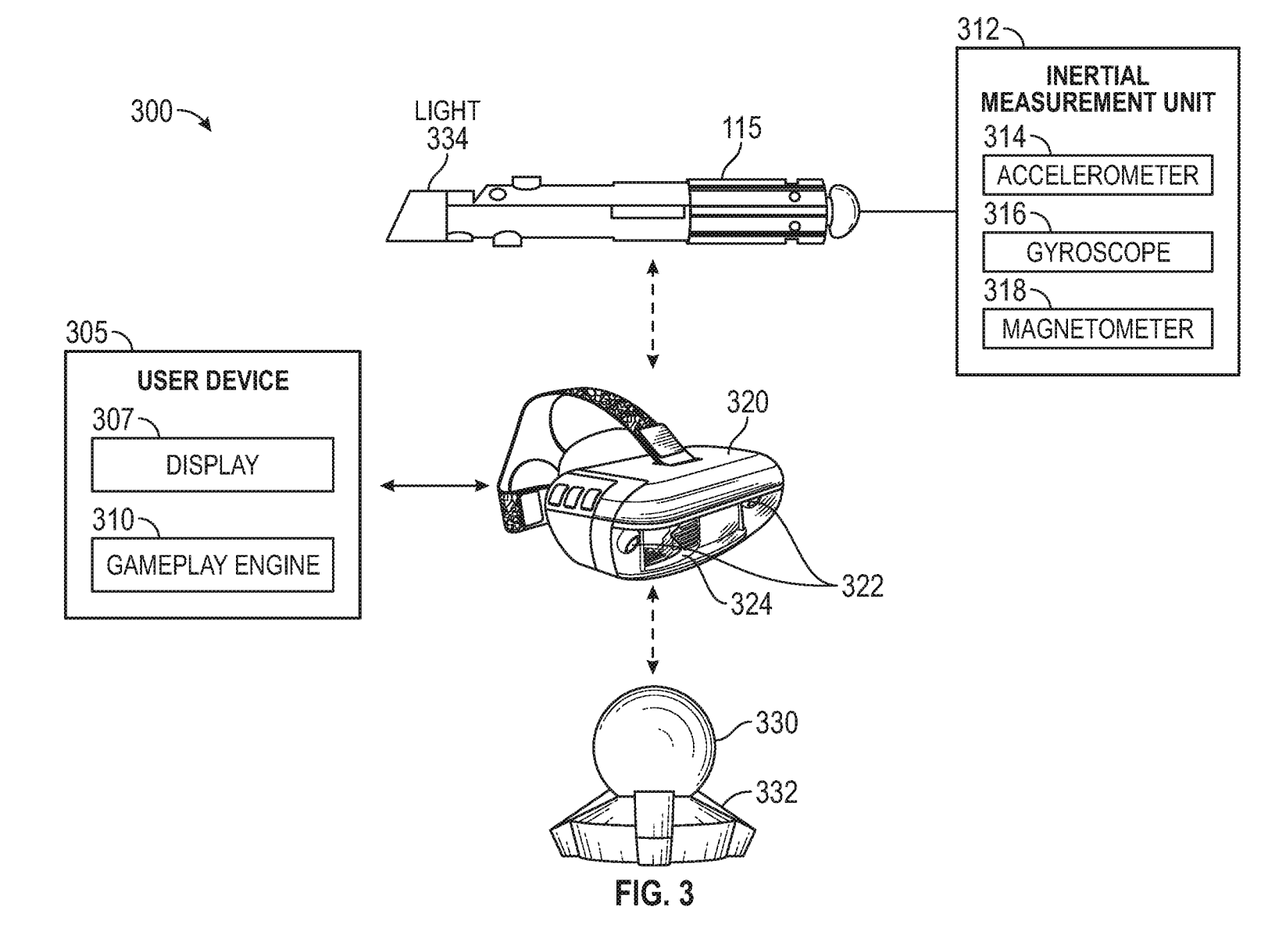
FIG. 3 illustrates an exemplary interactive environment, according to one embodiment described herein.

FIG. 3 illustrates an exemplary interactive environment, according to one embodiment described herein. In the example embodiment illustrated in FIG. 3, the interactive environment is an AR video game or system 300. Within the system 300, a headset 320 communicates with a user device 305. This communication can be done wirelessly, through Bluetooth® communications or any other suitable method. Further, the headset 320 can be connected to the user device 305 directly, or through a wired connection. The headset 320 can be a headset worn by the user, or may be any device including a visual display of any suitable type. For example, the headset 320 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

In some embodiments, the headset 320 is separate from the user device 305 but is configured to superimpose virtual imagery onto physical objects in the user's field of view. For example, the headset 320 may be a body-worn device. The headset 320 further includes a holder (not shown) for the user device 305. For example, the user device 305 can be a portable device like a smartphone or tablet. The user device 305 can be inserted into the holder in the headset 320 during gameplay. The headset 320 may also be configured as an eyepiece 324 or lens worn in front of the user's eye. In another example, the headset 320 may be integrated into other devices that are carried or handled by the user, or having any other suitable user interaction during the game playing experience. For example, while participating in the game play, the user can carry a toy blaster that includes an optical sight for aiming, and the headset 320 may be integrated in the optical sight.

The headset 320 includes the visual sensors 322. The visual sensors 322 can include cameras configured to sense visible light and/or infrared light. The visual sensors 322 can be configured to capture images of a user's real-world, physical environment. In one embodiment, the headset 320 uses the visual sensors 322 to capture images of the physical controller 115 (shown as hilt of a sword or saber in this example) and a tracking beacon 332. The physical controller 115 includes a light 334, while the beacon 332 includes a light 330. By performing image processing on the images captured by the visual sensors 322, the headset 320 or user device 305 can identify the location of the lights 334 and 330 in the images which can then be used to determine respective locations of the controller 115 and the tracking beacon 332 relative to the headset 320.

In one embodiment, the headset 320 includes audio output devices. The audio output devices may include conventional audio speakers having any suitable form factor (e.g., stand-alone, integrated in a stereo, headphones, etc.), as well as devices using alternative methods of producing sound perceptible by a user, such as bone conduction transducers in a body-worn device. In some embodiments, the audio output devices are included within the user device 305 (e.g., speakers of the smartphone, tablet device, etc.). In other embodiments, the audio output devices are separate from the user device 305.

In some embodiments, the user device 305 operates in an AR mode, generally configured to superimpose virtual images such as characters, objects, and/or dynamic visual effects into the user's natural field of view of the environment using a headset 320. The field of view of the user is generally determined by the direction the user faces while wearing the headset 320. In other embodiments, however, the user device 305 is configured to operate in a virtual reality (VR) mode while generating virtual imagery using the headset 320.

As shown in FIGS. 1 and 2, the user device 305 can generate a virtual blade extending from the hilt formed by the controller 115 which is held by the user. In one embodiment, the virtual image is generated by the user device 305 and displayed as a reflected image on the headset 320. The headset 320 can include reflective elements like mirrors, beam splitters, and the like to facilitate display of the reflected image which can be combined with a view of the real-world.

The headset 320 provides a compact AR display that may be carried or worn by the user during the gameplay experience. As discussed above, the headset 320 may include devices that are separate from the display of the user device 305. Implementations of the compact AR display that use a smartphone or other mobile computing device offer several advantages. For example, implementations able to use the user's smartphone provide a reduced manufacturing cost of the compact AR display, as no separate computing hardware need be included. A camera included in the smartphone may be used as a visual sensor 322 to dynamically provide information regarding the physical environment and the user's field of view. Using a smartphone may also provide increased convenience to the user, and may provide a relatively large display for outputting virtual content.

In one embodiment, the visual sensor 322 in the headset 320 is used to track the light 330 on the tracking beacon 332 in order to provide a reference point for the floor in the user's physical location. Further, the tracking beacon 332 can be in communication with the user device 305 and/or the headset 320 through a suitable wireless or wired communication protocol.

The controller 115 includes an inertial measurement unit (IMU) 312 which in turn includes an accelerometer 314, a gyroscope 316, and a magnetometer 318. During gameplay, a virtual blade, sword, or staff extending from the controller 115 is presented as virtual content to the user. To facilitate this, the controller 115 may include a variety of sensors and buttons. For example, the controller 115 can include physical buttons, touch sensors, or the like for user interaction. In addition, the IMU 312 includes a six or nine degree of freedom sensor which may use information received from the accelerometer 314, the gyroscope 316, and the magnetometer 318. The IMU 312 senses the orientation and movement of the controller 115, to facilitate projection of the virtual blade. The accelerometer 314 measures acceleration forces stemming from movement of the controller 115 in the user's physical environment. The gyroscope 316 measures orientation of the controller 115 in the user's physical environment. The magnetometer 318 measures properties of a magnetic field in the user's physical environment.

For example, when the controller 115 is used to simulate a sword or staff, the accelerometer 314 measures acceleration of the controller 115 as the user swings the controller 115. The user device 305 and the headset 320 can use these acceleration measurements from the accelerometer 314 to display acceleration of the virtual blade projected on the headset 320 to the user. In this scenario, the gyroscope 316 measures the orientation of the controller 115 in the user's physical environment. These orientation measurements can be used by the user device 305 and the headset 320 to display the orientation of the virtual blade on the headset 320. In addition, the controller 115 can be in communication with the user device 305, a headset 320, and/or the tracking beacon 332. This communication can be done wirelessly through Bluetooth communications, via a wired connection, or through any other suitable method.

The user device 305 includes a display 307 and a gameplay engine 310. In one embodiment, the gameplay engine 310 (e.g., a software application executed by one or more processors in the user device 305 or the headset 320) generates virtual content which is then outputted on the display 307. As described above, the virtual content can be inserted into a view of the real-world so it appears as if the virtual content is part of the real-world. Using the controller 115, the user can interact with the virtual content. In one embodiment, the gameplay engine 310 can receive data from the IMU 312 which permits the gameplay engine 310 to determine the current orientation of the controller 115. Using the images captured by the sensors 322, the engine 310 can determine the location of the controller 115 in 3D space or relative to the headset 320. With this information, the gameplay engine 310 can display virtual content that tracks the changes in orientation and position of the controller 115. Further, the gameplay engine 310 can use the orientation and location of the controller 115 to generate a pass-through texture that prevents virtual content that has a simulated distance further from the headset 320 from occluding the controller 115.

Figure 4:
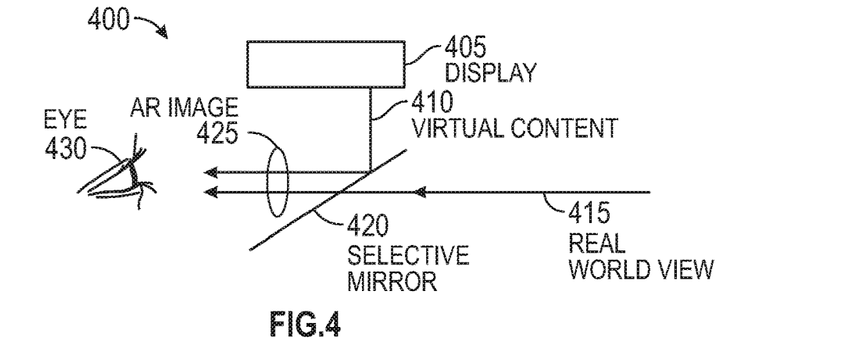
FIG. 4 illustrates inserting virtual content into a real-world image to generate an AR image, according to one embodiment described herein.

FIG. 4 illustrates inserting virtual content into a real-world view to generate an AR image, according to one embodiment described herein. For example, FIG. 4 illustrates an AR system 400 that may be used in the headset 320 in FIG. 3. As shown, a display 405 (e.g., the display 307 in the user device 305 in FIG. 3) is mounted in a horizontal direction such that virtual content 410 generated by the display 405 is emitted down towards a selective mirror 420 (e.g., a two-way mirror). While the selective mirror 420 reflects the light emitted by the display 405, light from a real-world view 415 can pass through the mirror 420 substantially unaffected by the mirror. As a result, the light from the display 405 which defines the virtual content 410 is mixed with light from the real-world view 415 to generate an AR image 425. Stated differently, the virtual content 410 is superimposed onto the real-world view 415 before it reaches the eye 430. As such, to the user it appears as if the virtual content 410 is part of the real-world environment. The embodiments herein describe techniques for preventing the virtual content 410 from occluding physical objects in the real-world view 415 when these physical objects are between the user and the simulated locations of the virtual content 410 in the real-world.

Figure 5:
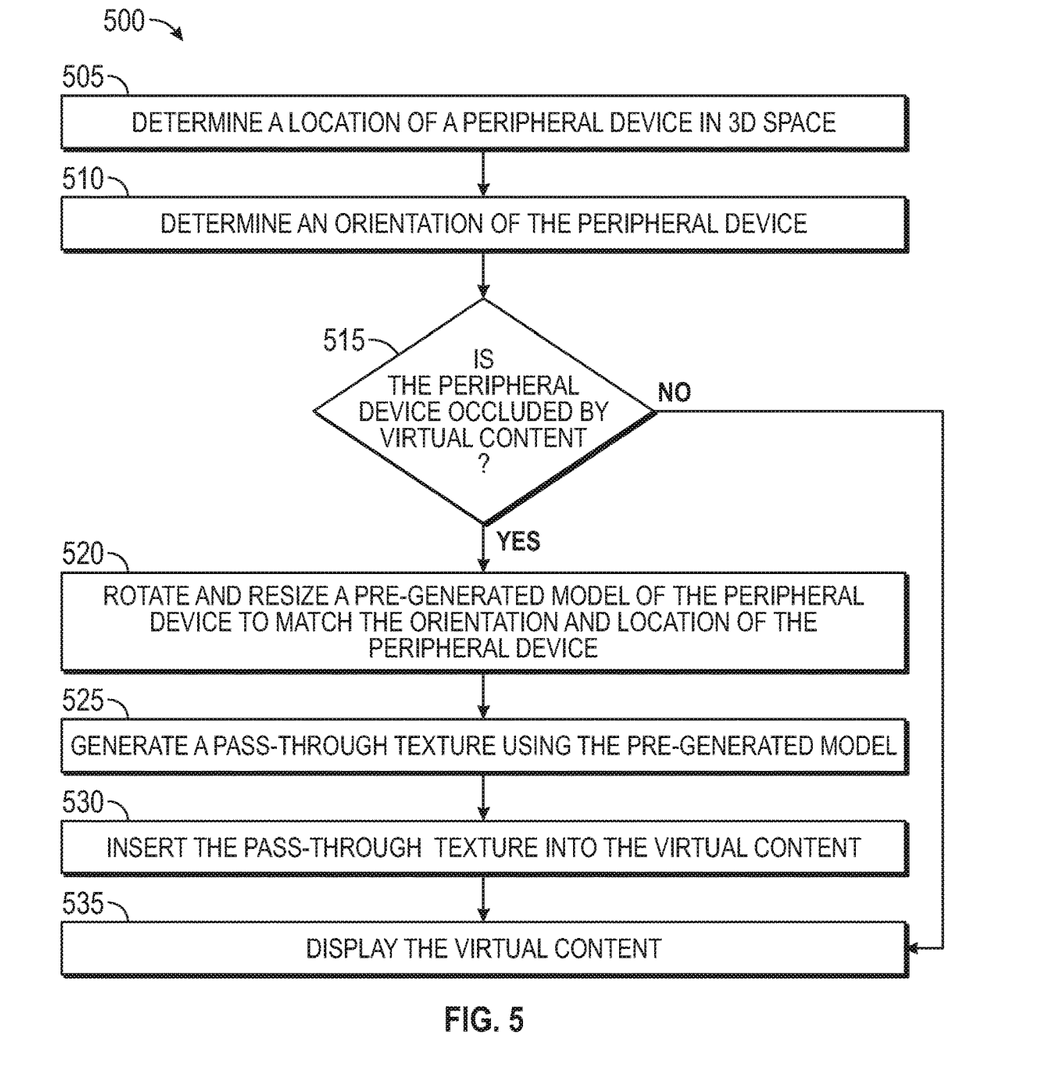
FIG. 5 is a flowchart for inserting a pass-through texture into virtual content, according to one embodiment described herein.

FIG. 5 is a flowchart of a method 500 for inserting a pass-through texture into virtual content, according to one embodiment described herein. At block 505, the gameplay engine determines a location of a peripheral device in 3D space. In one embodiment, the peripheral device is the physical controller 115, but is not limited to such. Generally, the peripheral device can be any device in the AR system which is communicatively coupled to the gameplay engine and provides location and/or orientation data to the gameplay engine.

In one embodiment, the peripheral device includes a visible or infrared light source which the AR system can track using visible or light sensors (e.g., the sensors 322). Using image processing techniques, the gameplay engine can identify a location of the peripheral device in 3D space and/or relative to the headset being worn by the user. During gameplay, the peripheral device may be moving quickly in space (e.g., change positions rapidly during a virtual sword fight). Nonetheless, tracking the light source on the peripheral device using image processing is a relatively quick process that can be done using a small amount of computational resources and still provide accurate tracking of the peripheral device.

In another embodiment, rather than determining the location of the peripheral device indirectly by tracking a light source, the peripheral device may generate and transmit location data to the gameplay engine. For example, the peripheral device may include a location system (e.g., GPS or an indoor tracking system) that identifies the location of the device and transmits that location to the gameplay engine.

At block 510, the gameplay engine determines an orientation of the peripheral device. In one embodiment, the peripheral device includes an IMU which generates orientation data that is then provided to the gameplay engine. Using the orientation data, the gameplay engine determines the orientation of the peripheral device in 3D space along, for example, six or nine degrees of freedom.

At block 515, the gameplay engine determines if the peripheral device is occluded by virtual content. For example, the peripheral device may be located in the real-world at a location where the gameplay engine is not displaying any virtual content. For example, the user may be holding the peripheral device down by her side while the virtual content is being displayed directly in front of her. Thus, even when the virtual content and the peripheral device are in the same AR image, the virtual content may not occlude the peripheral device, in which case, the method 500 can proceed from block 515 to block 535 and display the virtual content. However, if the location of the peripheral device is between a location of the user and the simulated location of the virtual content, the gameplay engine determine the peripheral device is occluded by the virtual content.

In one embodiment, if the peripheral device is occluded by the virtual content, before proceeding to block 520, the gameplay engine may check whether the virtual content has a simulated location that is further from the user than the location of the peripheral device. If not—i.e., the virtual content has a simulated location that is between the user and the peripheral device—then it may be desirable to permit the virtual content to occlude the peripheral device. Doing so maintains the illusion that the virtual content is closer to the user than the peripheral device.

Assuming it is undesirable for the virtual content to occlude the peripheral device, at block 520, the gameplay engine rotates and resizes a pre-generated model of the peripheral device to match the orientation and location of the peripheral device in 3D space. The pre-generated model may be generated before the AR system is powered on (and is stored in non-volatile memory) or may be generated when the AR system is powered on but before gameplay has begun. In any case, the pre-generated model is generated before block 515 when the gameplay engine determines that a peripheral device is being occluded by virtual content.

One advantage of using a pre-generated model is that the amount of time to generate the pass-through texture is greatly reduced relative to a occlusion system that relies on real-time measurements to generate a model for a physical object. For example, an AR system can use real-time room mesh generation to identify physical objects in the real-world, model those objects, and then modify the virtual content so these objects are not occluded. However, mesh generation relies on additional hardware that can be omitted in the present embodiments. For example, mesh generation uses depth cameras to identify a distance between the headset and the physical objects in the room. The images captured by the depth cameras are processed using a compute intensive algorithm to identify the size, location, and orientation of the physical objects. While performing real-time room mesh generation may be sufficient for stationary physical objects, this technique may be too slow for detecting moving objects, especially rapidly moving objects like a game controller. Even assuming a AR system has sufficient compute resources, real-time room mesh generation may result in latency because moving objects cannot be tracked as fast as they move through the physical environment.

Because the method 500 uses a pre-generated model and uses orientation data provided by the peripheral device, it avoids many of the short comings of using a real-time mesh generation technique. That is, the gameplay engine does not need to determine the orientation of the peripheral device by performing complicated edge detection on image captured by depth cameras since this information is captured by the IMU on the peripheral device. While the gameplay engine may process images to identify a location of the peripheral device by tracking an integrated light source, this is a much faster process relative to the image processing techniques used in mesh generation. Further, because the size and shape of the peripheral device are known before gameplay begins, the AR system can use the known dimensions of the peripheral device to generate the pre-generated model beforehand. In contrast, real-time mesh generation generates models for physical objects in real-time based on captured images. However, although the embodiments herein may not use real-time mesh generation, in other embodiments, some or all of the techniques in real-time mesh generation may be combined with the techniques described herein. For example, the AR system may include depth cameras which capture images of the peripheral device, which, when combined with the orientation data generated by the IMU on the device, can provide a more accurate orientation of the peripheral device. Or the AR system may use real-time mesh generation to track stationary objects in the physical environment which may be located between the user and a simulated location of the virtual content. Thus, techniques used in real-time mesh generation can be combined with the embodiments described herein.

In one embodiment, the pre-generated model represents the size and shape of the physical peripheral device. For example, when powering on, the gameplay engine may identify any peripheral device and select the pre-generated model for that device (which may be stored in memory). In another example, when a peripheral device is discovered, the peripheral device may transmit its dimensions to the gameplay engine which can then generates the pre-generated model for the peripheral device before gameplay begins.

Figure 6A:
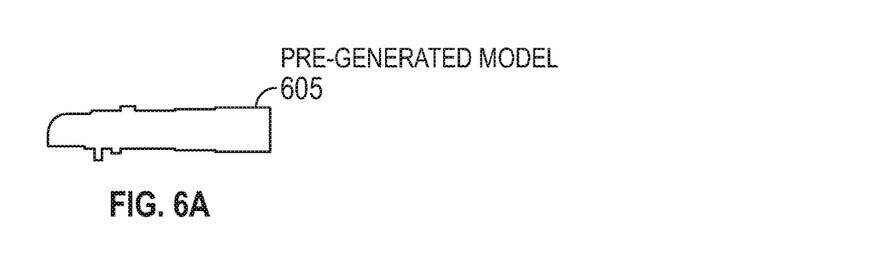
FIGS. 6A and 6B illustrate a pre-generated model of a physical object, according to one embodiment described herein.

FIGS. 6A and 6B illustrate a pre-generated model of a physical object, according to one embodiment described herein. FIG. 6A illustrates a visual representation of the pre-generated model 605 which is an outline of the controller 115 illustrated in FIG. 3. Although FIG. 6A illustrates a 2D model 605, in other embodiments, the pre-generated model 605 is a 3D model. Data representing the pre-generated model 605 can be stored in memory in the user device or the headset. Thus, the pre-generated model 605 is readily available when performing the method 500.

Figure 6B:
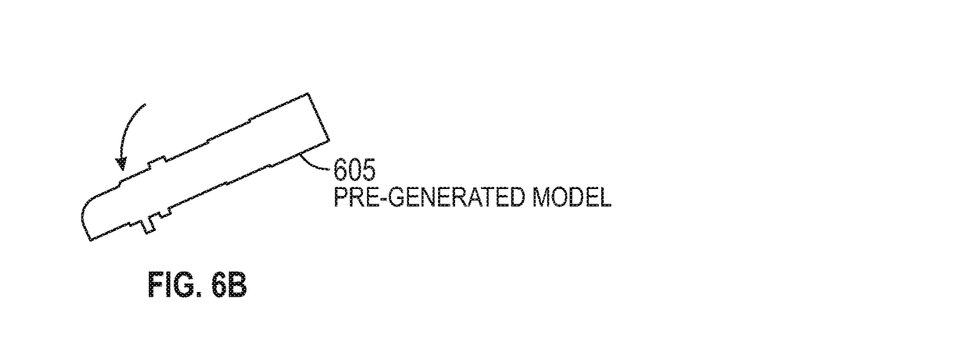

FIG. 6B illustrates rotating and resizing the pre-generated model 605 using the location and orientation of the physical peripheral device. That is, the gameplay engine may rotate the model 605 (as shown by the arrow) so that the model 605 has the same orientation in 3D space as the actual peripheral device. Further, using the location of the peripheral device relative to the user, the gameplay engine can determine the size of the peripheral device from the perspective of the user. Put differently, the gameplay engine determines the amount of area the peripheral device occupies in the user's field of view. The engine then adjusts the size of the pre-generated model 605 accordingly to occupy the same area in the user's field of view.

Returning to method 500, at block 525 the gameplay engine generates a pass-through texture using the pre-generated model. Stated differently, the gameplay engine converts the model (which has been oriented and sized appropriately) into a displayable texture. In one embodiment, the gameplay engine colors the pass-through texture such that when outputted for display, the texture does not cause light to be emitted from the display screen. For example, when outputting black, a display screen does not emit light (i.e., the color black is the absence of light). Thus, if the pass-through texture is black, then when outputted for display, the display screen does not output any light for the area in the screen displaying the pass-through texture. As such, no light is emitted from the display when displaying the pass-through texture, and as a result, any light received at the headset from the real-world environment at the location corresponding to the texture is not occluded. This is shown visually in FIG. 7.

Figure 7:
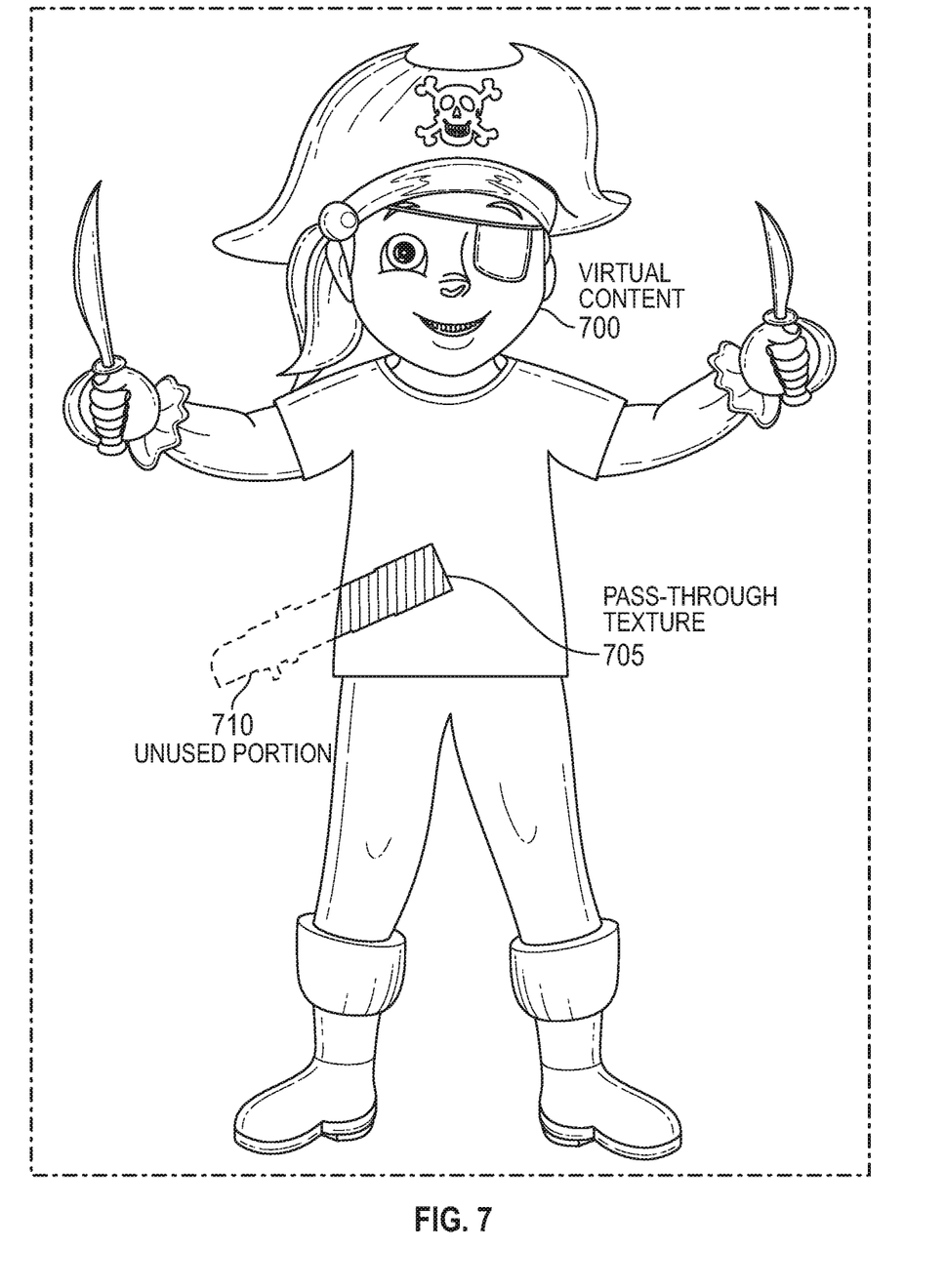
FIG. 7 illustrates inserting a pass-through texture into virtual content, according to one embodiment described herein.

FIG. 7 illustrates inserting a pass-through texture 705 into virtual content 700, according to one embodiment described herein. In one embodiment, the gameplay engine inserts the pass-through texture 705 into the virtual content 700 before the virtual content 700 is displayed—i.e., before the virtual content is inserted into the real-world view.

As shown, the pass-through texture 705 has the same size and orientation as the pre-generated model 605 illustrated in FIG. 6B. In one embodiment, the gameplay engine converts the pre-generated model 605 into the pass-through texture 705 so that the texture 705 can be inserted into the virtual content 700 and displayed. Put differently, the graphical model 605 (which may be a 3D model) is converted into a 2D displayable texture 705.

In one embodiment, the gameplay engine selects a color for the texture 705 that permits light from the environment to pass through the texture 705. For example, when displaying black, the display may not emit any light (e.g., the default color for the display is black). Thus, if the pass-through texture 705 is a black texture, the display does not emit light at the portion of the display that has the texture 705. As such, the display does not emit any light that could occlude light received from the real-world environment that corresponds to the same location as the texture 705.

In FIG. 7, the texture 705 is inserted into the virtual content 700 to correspond to the same location as the peripheral device held by the user. The hashing indicates that the texture 705 may be colored black so that the display does not emit light that could occlude the light reflecting from (or emitted by) the peripheral device. As such, the peripheral device appears to the user as being between the user and the virtual content 700. Moreover, not all of the texture 705 may overlap with the virtual content 700. For example, there is an unused portion 710 of the model that does not need to be converted into the texture 705 since this portion 710 does not overlap the virtual content 700. However, in one embodiment, the remaining portions of the display that do not include the virtual content 700 may be assigned the color black (so that the display does not emit light that occludes the real-world view) which may be the same color as the texture 705. In that example, the unused portion 710 may also be black like the color of the pass-through texture 705.

While black is provided as a suitable pass-through color, the examples are not limited to such. For example, other colors may result in the display not emitting light so that the peripheral device is occluded. Furthermore, in AR systems where light from the real-world view passes through the display (unlike the example shown in FIG. 4), the pass-through texture 704 may be a transmissive portion of the display rather than black which would block light received from the real-world view.

Figure 8:
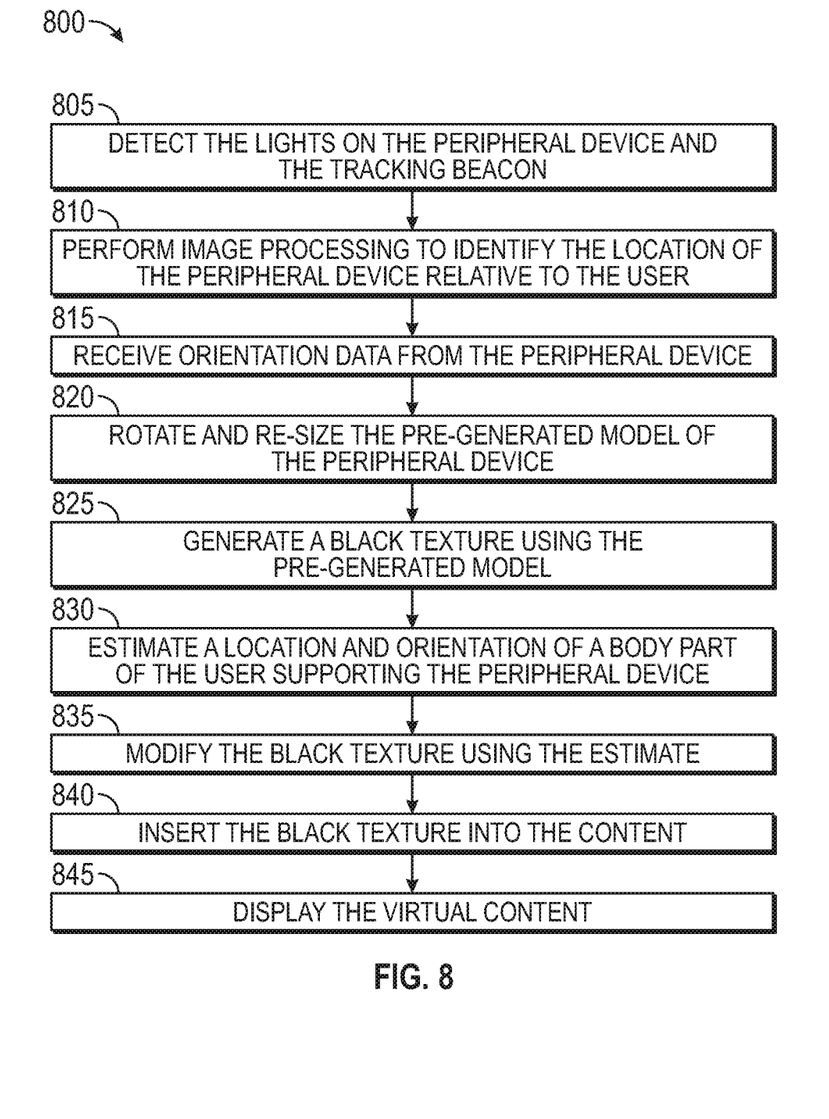
FIG. 8 is a flowchart for inserting a black texture model into virtual content, according to one embodiment described herein.

FIG. 8 is a flowchart of a method 800 for inserting a black texture model into virtual content, according to one embodiment described herein. At block 805, the gameplay engine detects the lights on the peripheral device and the tracking beacon. In one embodiment, the tracking beacon is placed on the floor of the user's environment which provides a reference point for displaying the virtual content.

At block 810, the gameplay engine performs image processing to identify the location of the peripheral device relative to the user. As mentioned above, performing image processing to identify and track the light sources on the peripheral device and the tracking beacon may be much faster than the image processing performed on images captured by depth sensors when performing real-time mesh generation. Thus, at block 810, the gameplay engine can track the location of the peripheral device even if it moves rapidly (such as during a simulated sword fight). However, in another embodiment, rather than using image processing, the peripheral device and location tracker can have internal location tracking systems which provide their respective 3D locations to the gameplay engine which means the gameplay engine can avoid performing image processing to track these objects. The gameplay engine can then determine their relative location to the user (or to the headset worn by the user).

At block 815, the gameplay engine receives orientation data from the peripheral device. As mentioned above, the orientation data may be generated by an IMU in the peripheral device and then transmitted wirelessly or by a wired connection to the gameplay engine.

At block 820, the gameplay engine rotates and re-sizes the pre-generated model of the peripheral device using the location and orientation of peripheral device. In one embodiment, the gameplay engine orients the model to have the same orientation in 3D space as the current orientation of the peripheral device. Further, the gameplay engine may enlarge or shrink the dimensions of the model so that, relative to the view of the user, the size of the model is the same as the size of the peripheral device.

At block 825, the gameplay engine generates a black texture (e.g., a pass-through texture) using the pre-generated model. The black texture may be a 2D displayable texture or graphic which is assigned the color black so that, when displayed, the display does not emit light in the region of the texture.

At block 830, the gameplay engine estimates a location and an orientation of a body part of the user supporting the peripheral device. Referring back to FIG. 2, some of the hand and arm of the user 120 may still be occluded by the virtual character 105 when the pass-through texture corresponding to the peripheral device is inserted. This occluded physical content 205 is represented by the ghosted lines. If the exact orientation and location of the hand and/or arm of the user 120 are known, then the gameplay engine can modify the black texture to also cover the body parts of the user 120 so that they are not occluded by the virtual content. For example, in one embodiment, the peripheral device may include sensors that indicate the location of the user's fingers on the device, or the user may wear a wrist band or arm band that can be used to identify the location and orientation of the user's arm.

Assuming the location and the orientation of the user are not known, the gameplay engine can nonetheless estimate this information. For example, the gameplay engine can assume the user is holding the peripheral device as shown in FIGS. 1 and 2, and as such, can estimate the location and orientation of the fingers and the user's arm based on the current orientation of the peripheral device (e.g., whether the user is holding the device horizontally, vertically, extending away from her, etc.). Further, the gameplay engine may know the height or age of the user which can be used to estimate the length of the user's arm. With this information the gameplay engine can estimate the orientation and location of the arm depending on the distance between the headset and the peripheral device and its current orientation.

At block 835, the gameplay engine modifies the black texture using the estimate determined at block 830. That is, the gameplay engine may increase the size of the black texture and change its boundary to cover portions of the user's hand or arm.

At block 840, the gameplay engine inserts the black texture into the virtual content, and at block 845, the virtual content is displayed along with the black texture. In this example, the black texture prevents the displayed virtual content from occluding the peripheral device as well as some of the body of the user, thereby enhancing the realism of the AR system.

In the preceding, reference is made to embodiments of the invention. However, it should be understood that the invention is not limited to specific described embodiments. Instead, any combination of the features and elements described herein, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   determining a location of a handheld peripheral device of an augmented reality (AR) system in a real-world environment;
   determining an orientation of the handheld peripheral device in the real-world environment based on data received from a first sensor disposed on the handheld peripheral device;
   orienting and sizing a pre-generated model of the handheld peripheral device to match a size and the orientation of the handheld peripheral device relative to a viewpoint of a user;
   generating a pass-through texture using the pre-generated model;
   determining a location of fingers of the user on the handheld peripheral device using a second sensor disposed on the handheld peripheral device;
   estimating an orientation and location of an arm of the user based on an estimation of a length of the arm, a distance between a headset and the handheld peripheral device, and the orientation of the handheld peripheral device;

modifying the pass-through texture to include (i) the fingers of the user based on the determined location of the fingers and (ii) the arm of the user;

inserting the modified pass-through texture into virtual content, wherein the modified pass-through texture permits light emitted from the real-world environment to be seen by the user without being occluded by the virtual content; and outputting for display the modified pass-through texture and the virtual content.

2. The method of claim 1, further comprising:
determining that the handheld peripheral device has a location in the real-world environment that overlaps a location of the virtual content in an AR image.

3. The method of claim 1, wherein the pre-generated model is a 3D model, and wherein generating the pass-through texture comprises:
converting the pre-generated model into the pass-through texture, wherein the pass-through texture comprises a 2D displayable texture; and
assigning a color to the pass-through texture such that a display in the AR system is black in an area displaying the pass-through texture.

4. The method of claim 1, further comprising:
receiving inertial measurement unit (IMU) data from the handheld peripheral device, wherein the orientation of the handheld peripheral device is determined using the IMU data.

5. The method of claim 1, wherein determining the location of the handheld peripheral device in the real-world environment comprises:
capturing an image of the handheld peripheral device using a light sensor in the AR system, wherein the handheld peripheral device comprises an illuminated light source detectable by the light sensor; and
tracking the illuminated light source using the captured image to determine the location of the handheld peripheral device.

6. The method of claim 1,
wherein the length of the arm is estimated based on a height or age of the user.

7. A non-transitory computer-readable storage medium comprising computer-readable program code embodied therewith, the computer-readable program code is configured to perform, when executed by a processor, an operation, the operation comprising:
determining a location of a handheld peripheral device of an AR system in a real-world environment;
determining an orientation of the handheld peripheral device in the real-world environment based on data received from a first sensor disposed on the handheld peripheral device;
orienting and sizing a pre-generated model of the handheld peripheral device to match a size and the orientation of the handheld peripheral device relative to a viewpoint of a user;
generating a pass-through texture using the pre-generated model;
determining a location of fingers of the user on the handheld peripheral device using a second sensor disposed on the handheld peripheral device;
estimating an orientation and location of an arm of the user based on an estimation of a length of the arm, a distance between a headset and the handheld peripheral device, and the orientation of the handheld peripheral device;

modifying the pass-through texture to include (i) the fingers of the user based on the determined location of the fingers and (ii) the arm of the user;

inserting the modified pass-through texture into virtual content, wherein the modified pass-through texture permits light emitted from the real-world environment to be seen by the user without being occluded by the virtual content; and outputting for display the modified pass-through texture and the virtual content.

8. The non-transitory computer-readable storage medium of claim 7, the operation further comprising:
determining that the handheld peripheral device has a location in the real-world environment that overlaps a location of the virtual content in an AR image.

9. The non-transitory computer-readable storage medium of claim 7, wherein the pre-generated model is a 3D model, and wherein generating the pass-through texture comprises:
converting the pre-generated model into the pass-through texture, wherein the pass-through texture comprises a 2D displayable texture; and
assigning a color to the pass-through texture such that a display in the AR system is black in an area displaying the pass-through texture.

10. The non-transitory computer-readable storage medium of claim 7, the operation further comprising:
receiving inertial measurement unit (IMU) data from the handheld peripheral device, wherein the orientation of the handheld peripheral device is determined using the IMU data.

11. The non-transitory computer-readable storage medium of claim 7, wherein determining the location of the handheld peripheral device in the real-world environment comprises:
capturing an image of the handheld peripheral device using a light sensor in the AR system, wherein the handheld peripheral device comprises an illuminated light source detectable by the light sensor; and
tracking the illuminated light source using the captured image to determine the location of the handheld peripheral device.

12. The non-transitory computer-readable storage medium of claim 7, the operation further comprising:
estimating the location or orientation of the arm or the fingers of the user based on the orientation of the handheld peripheral device.

13. A non-transitory computer-readable storage medium comprising computer-readable program code embodied therewith, the computer-readable program code is configured to perform, when executed by a processor, an operation, the operation comprising:
determining a location of a handheld physical object in a real-world environment;
determining an orientation of the handheld physical object in the real-world environment based on data from a first sensor disposed on the handheld physical object;
orienting and sizing a pre-generated model of the handheld physical object to match a size and the orientation of the handheld physical object relative to a viewpoint of a user, wherein the pre-generated model was generated before determining the location and orientation of the handheld physical object;
generating a black texture using the pre-generated model;
determining a location of fingers of the user on the handheld physical object using a second sensor disposed on the handheld physical object;

estimating an orientation and location of an arm of the user based on an estimation of a length of the arm, a distance between a headset and the handheld physical object, and the orientation of the handheld physical object;

modifying the black texture to include (i) the fingers of the user based on the determined location of the fingers of the user and (ii) the arm of the user;

inserting the modified black texture into a portion of virtual content that corresponds to the location of the handheld physical object in the real-world environment; and outputting for display the modified black texture and the virtual content to generate an AR image.

14. The non-transitory computer-readable storage medium of claim 13, wherein the pre-generated model is a 3D model, and wherein generating the black texture comprises:

converting the pre-generated model into the black texture, wherein the black texture comprises a 2D displayable texture; and assigning black to the black texture such that a display in an AR system outputs black in an area displaying the black texture.

15. The non-transitory computer-readable storage medium of claim 13, the operation comprising:

outputting for display projected virtual content that extends from the handheld physical object, wherein the handheld physical object comprises a game controller for interacting with the virtual content.

16. The non-transitory computer-readable storage medium of claim 13, the operation further comprising:

receiving inertial measurement unit (IMU) data from the handheld physical object, wherein the orientation of the handheld physical object is determined using the IMU data.

17. The non-transitory computer-readable storage medium of claim 13, wherein determining the location of the handheld physical object in the real-world environment comprises:

capturing an image of the handheld physical object using a light sensor, tracking the handheld physical object using the captured image to determine the location of the handheld physical object.

18. The non-transitory computer-readable storage medium of claim 17, wherein the handheld physical object comprises an illuminated light source detectable by the light sensor, and wherein tracking the handheld physical object using the captured image comprises:

tracking the illuminated light source using the captured image.

19. The non-transitory computer-readable storage medium of claim 13, wherein the modified black texture, when displayed, prevents the virtual content from occluding a body part of the user.

20. The non-transitory computer-readable storage medium of claim 13, wherein the length of the arm is estimated based on a height or age of the user.

* * * * *

UNITED STATES PATENT AND TRADEMARK OFFICE
CERTIFICATE OF CORRECTION

PATENT NO. : 10,755,486 B2  
APPLICATION NO. : 15/957807  
DATED : August 25, 2020  
INVENTOR(S) : Elliott H. Baumbach et al.

Page 1 of 1

It is certified that error appears in the above-identified patent and that said Letters Patent is hereby corrected as shown below:

On the Title Page

In item (72), in Column 1, in "Inventors", Line 2, delete "Jonathan R D Hsu," and insert -- Jonathan RD Hsu, --, therefor.

Signed and Sealed this
Twentieth Day of October, 2020

Andrei Iancu
*Director of the United States Patent and Trademark Office*